United States Patent [19]
Hashimoto

[11] Patent Number: 5,479,267
[45] Date of Patent: Dec. 26, 1995

[54] DEVICE FOR COMBINING VCR AND TV

[75] Inventor: Kazuo Hashimoto, Tokyo, Japan

[73] Assignee: Hashimoto Corporation, Tokyo, Japan

[21] Appl. No.: 439,066

[22] Filed: May 19, 1995

Related U.S. Application Data

[63] Continuation of Ser. No. 47,444, Apr. 16, 1993, abandoned.

[30] Foreign Application Priority Data

Apr. 22, 1992 [JP] Japan ..................................... 4-127923

[51] Int. Cl.$^6$ ..................................................... H04N 5/76
[52] U.S. Cl. ........................ 358/335; 360/33.1; 348/906; 348/705; 348/706
[58] Field of Search ..................................... 358/335, 310; 360/33.1, 27; 348/906, 705, 706; H04N 5/76, 9/79

[56] References Cited

U.S. PATENT DOCUMENTS

| | | |
|---|---|---|
| 3,932,889 | 1/1976 | Takeda et al. ............................. 360/95 |
| 4,527,133 | 7/1985 | Money ..................................... 307/261 |
| 4,706,121 | 11/1987 | Young ..................................... 358/142 |
| 4,706,141 | 11/1987 | Oba et al. ............................... 360/96.5 |
| 5,193,009 | 3/1993 | Park ....................................... 360/33.1 |
| 5,223,995 | 6/1993 | Sasaya .................................... 360/96.5 |
| 5,307,173 | 4/1994 | Yuen et al. .............................. 358/335 |
| 5,335,079 | 8/1994 | Yuen et al. .............................. 358/335 |

Primary Examiner—Tommy P. Chin
Assistant Examiner—Khoi Truong
Attorney, Agent, or Firm—Lowe, Price, LeBlanc & Becker

[57] ABSTRACT

A video cassette recorder (VCR) automatically controlled by the "G Code" ("Plus Code") and a television set for monitoring purposes each have their own tuner. A user is able to monitor on the TV set a program designated by the "G Code," even though the VCR does not operate because no videotape has been loaded into the VCR. On the other hand, when a videotape is loaded into the VCR, the user is also able to monitor on the TV set the program, which is being recorded on the VCR, without manually operating the TV set, or monitor on the TV set a program on a channel different from that of the VCR by changing the channel of the tuner for the TV set.

6 Claims, 1 Drawing Sheet

DEVICE FOR COMBINING VCR AND TV

This application is a continuation of application Ser. No. 08/047,444 filed Apr. 16, 1993, now abandoned.

BACKGROUND OF THE INVENTION

The present invention relates to a video cassette recorder (VCR) including a television set.

Lately a device for controlling VCRs by a TV program specifying code consisting of several digits of numbers known as a "Plus Code" or "G Code," is widely used in countries such as the United States. After storing a number of the specifying codes, such a device controls the VCR so that the latter automatically performs one by one recording of TV programs designated by the codes.

Such specifying codes are published in TV program listings of newspapers or TV guides. Users are able to control VCRs by inputting the codes through the keypad after initializing the device once. However, such a convenient device is useless if the user does not want to record any TV program on the VCR.

SUMMARY OF THE INVENTION

The present invention is directed to allow a TV set to display the same program as that of a VCR through the VCR even though a videotape, for example, VHS tape, is not Loaded into the VCR, by utilizing a VCR control system controlled by the "G Code."

Accordingly, the present invention provides a switching means which operates in response to the detection of the presence of a videotape in the VCR and a switching means which enables individual or combination use of two tuners.

Figure 1:
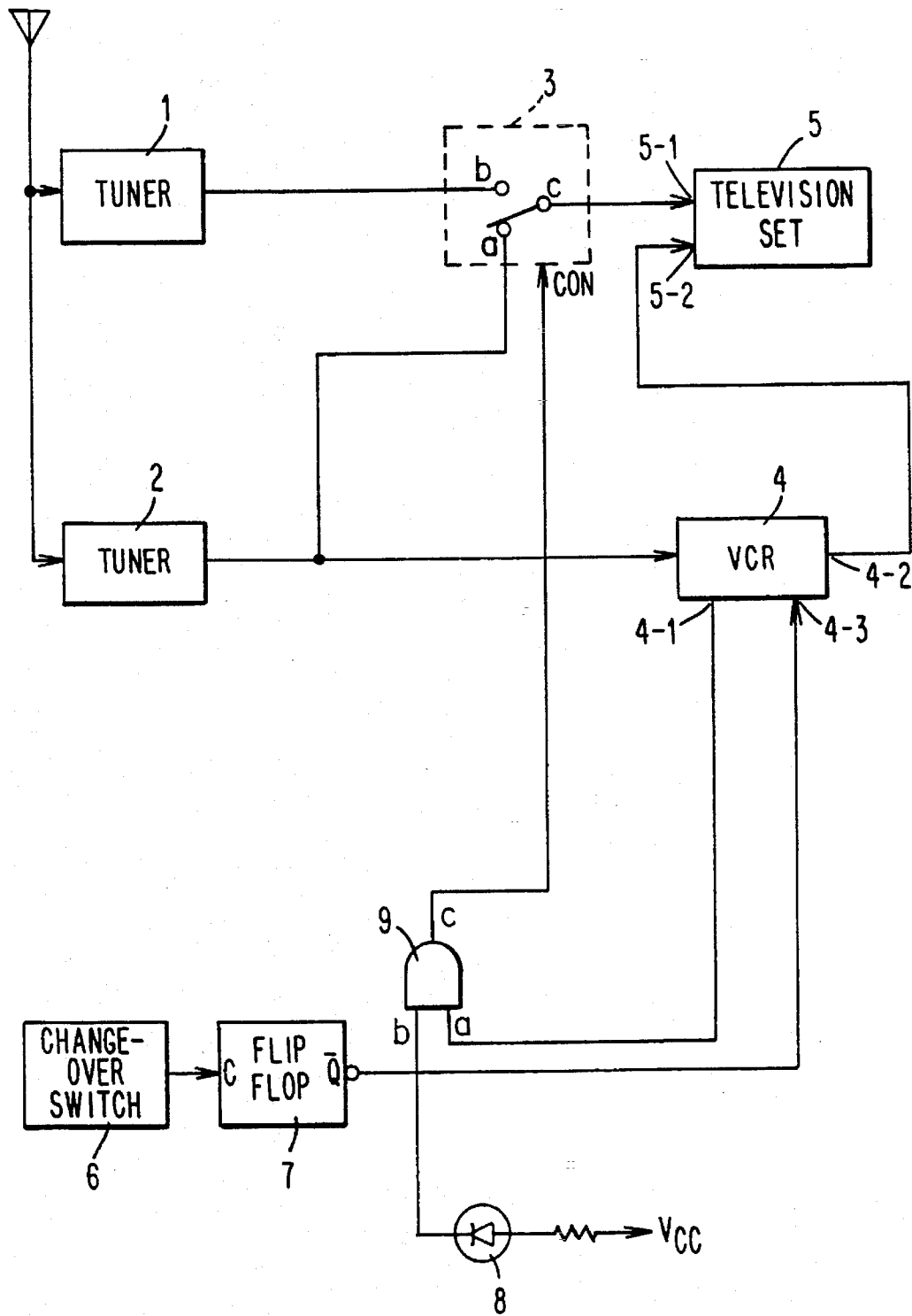
FIG. 1 is a block diagram illustrating an embodiment of the present invention.

(Legend)
1. Tuner (contained in TV 5)
2. Tuner (contained in VCR 4)
3. Analog switch
4. VCR
4-1. Tape detection output terminal
4-2. Video output terminal
4-3. Stop input terminal
5. Television set
5-1. Television input terminal
5-2. Video input terminal
6. Change-over switch
7. Flip-flop
8. Light emitting diode
9. AND gate

DESCRIPTION OF THE PREFERRED EMBODIMENT

An embodiment of the present invention will be subsequently described by reference to FIG. 1. In the drawing, numeral 1 refers to a tuner which is contained in television set 5, and 2 to a tuner which is contained in VCR 4. Both tuners are connected to the present device as shown. Numeral 3 refers to an analog switch for VCR 4. When the control terminal (con) of analog switch 3 has a low voltage, contact "a" is closed as shown in the drawing. When the control terminal has a high voltage, however, contact "b" is closed.

Numeral 4 refers to a VCR. Numeral 4-1 refers to a tape detection output terminal which outputs a high level voltage when a videotape (not shown) is loaded into VCR 4. Numeral 4-2 refers to a video output terminal, and 4-3 to a stop input terminal which is connected to a stop button (not shown) to terminate movement of the aforementioned videotape. Numeral 5 refers to a television set, 5-1 to a television input terminal which receives output from the aforementioned tuners 1 and 2 via analog switch 3, and 5-2 to a video input terminal which receives a video output generated by VCR 4.

Numeral 6 refers to a change-over switch which registers that no videotape has been loaded into the aforementioned VCR 4 even though a videotape (not shown) is actually loaded. An output of change-over switch 6 triggers binary type flip-flop 7, wherein an output Q of flip-flop 7 is switched from high level to low level and vice versa. The state of outputting can be monitored through light emitting diode 8.

Numeral 9 refers to an AND gate. Terminal "a" connected to tape detection output terminal 4-1 has a high voltage when the aforementioned videotape is loaded. When terminal "b" has a high voltage in accordance with an output of flip-flop 7, the voltage of output terminal "c" becomes high and the point of contact of analog switch 3 is switched to the position ("b") opposite to that ("a") of FIG. 1. When terminal "b" of AND gate 9 has a low voltage, output terminal "c" always has a low voltage and the point of contact of analog switch 3 is in the position ("a") shown in FIG. 1. When the aforementioned output terminal "c" has a low voltage, change-over switch 6 registers that no videotape has been loaded into VCR 4 even though a videotape is actually loaded.

Incidentally, the present VCR is controlled by "G Codes" (the Japanese version of Gemstar's Plus Codes) lately published in Japanese newspapers such as "The Asahi."

Operation of the present embodiment will be subsequently described.

(i) Description of the operation in the case that although no videotape has been loaded into the VCR, in accordance with the reservation designated by the "Plus Code," both the VCR and TV set are turned on and the TV set displays the same program as that of the VCR The following description is predicated upon the assumption that a TV program reservation designated by the "G Code" is registered in a remote control box (not shown), for example, "Video Plus" (in Japan) or "VCR Plus" (in the U.S.).

When the starting time of the recording arrives in accordance with the aforementioned reservation, coded infrared rays are emitted from the aforementioned remote control box. The light sensor (not shown) of VCR 4 receives the infrared rays, and the power source of TV set 5, which is constituted to be linked with the power source of VCR 4, is turned on with television input terminal 5-1 being set in a operative condition. Further, the aforementioned infrared ray commands that the currently set channel of VCR 4 be switched to the reserved channel and VCR 4 be set to a recording mode. As no videotape has been loaded into VCR 4, however, VCR 4 is turned on and the channel is switched by tuner 2, but VCR 4 cannot be set to the recording mode.

When no videotape is loaded into VCR 4 as stated above, an output of detection output terminal 4-1 has a low voltage, and therefore output terminal "c" of AND gate 9 has a low voltage. As it is clear from the above, the point of contact of analog switch 3 is positioned as shown in FIG. 1. TV set 5 receives an output of tuner 2 via television input terminal 5-1 and contacts "a" and "c" of analog switch 3, wherein the same program as that of VCR 4 is displayed. Accordingly, even if the user did not want to record the pre-reserved program on VCR 4 or forgot that the program had been reserved, he or she would still see the program on TV set 5.

When the finish time of the recording arrives in accordance with the "G Code," the power sources of VCR 4 and TV set 5 are turned off in response to the coded infrared ray emitted from the aforementioned remote control box.

(ii) Description of the operation in the case that a TV program can be watched on TV set 5 while another TV program, which was reserved in accordance with the "G Code," is being recorded on a videotape loaded into VCR 4

If VCR 4, into which a videotape is loaded, and TV set 5 are turned on in response to the coded infrared ray, which is emitted from the remote control box at the aforementioned starting time of the recording, an output of tape detection output terminal 4-1 rises to a high level and is applied to input terminal "a" of AND gate 9.

On the other hand, input terminal "b" of AND gate 9 is connected to the output terminal of flip-flop 7, and is maintained at a high level during the initialization that occurs when flip-flop 7 is turned on (as will be mentioned later, when change-over switch 6 is pressed, input terminal "b" is switched to a low level, however, when the switch is pressed again, the terminal is returned to a high level, and this operation is repeated as occasion demands.) Therefore, output terminal "c" of AND gate 9 rises to a high level, and the point of contact of analog switch 3 is switched to the position ("b") opposite to that ("a") of FIG. 1. In the above situation, an output of tuner 2 is applied to VCR 4, and therefore the pre-reserved TV program is recorded on the videotape.

An output of tuner 1 is applied to TV set 5 via television input terminal 5-1 and contacts "b" and "c" of analog switch 3, wherein the output is displayed on the television screen. In this situation, as tuners 1 and 2 are independent of each other, the user can change the channel of TV set 5 at his or her discretion in order to watch a desired TV program regardless of the current channel of VCR 4.

(iii) Description of the operation in the case that a TV program on the channel to which VCR 4 is currently set can be monitored on TV set 5 by making a change-over switch register that no videotape has been loaded into VCR 4 even after a videotape was actually loaded into the VCR As stated in item (ii), when a videotape is loaded into VCR 4, any TV program can be watched on TV set 5 regardless of the channel to which VCR 4 is currently set. In the case of item (i), in order to monitor on TV set 5 the channel to which VCR 4 is currently set in accordance with the "G Code," it is required to prevent the insertion of videotape into VCR 4. However, some users may think that it is more convenient to keep a videotape in VCR 4 all the time. For such a case, change-over switch 6 is provided so that the channel to which VCR 4 is set can be monitored on TV set 5.

When the aforementioned change-over switch 6 is pressed, an output of binary type flip-flop 7 is switched from the aforementioned high level to a low level. At this time, input terminal "b" of AND gate 9 is kept at a low level and its output is applied to stop input terminal 4-3. This simulates the condition of a stop button being pressed, so that a videotape loaded into VCR 4 suspended from operation even though VCR 4 is turned on.

In this situation, when VCR is turned on and a channel of tuner 2 is set in response to an infrared ray from the aforementioned remote control box, an output of tape detection output terminal 4-1 rises to a high level because a videotape has already been loaded into VCR 4. Therefore, input terminal "a" of AND gate 9 is raised to a high level. However, output terminal "c" of AND gate 9 is still kept at a low level because input terminal "b" of AND gate 9 is kept at a low level as stated above. Therefore, the point of contact of analog switch 3 is not switched.

In the above situation, an output of tuner 2 is applied to VCR 4 and also to TV set 5 via terminals "a" and "c" of analog switch 3 at the same time. Therefore, the user can monitor on TV set 5 the same channel as that of VCR 4.

As stated above, by selectively connecting an input terminal of TV set 5 for monitoring purposes to either an output terminal of tuner 1 for TV set 5 or to an output terminal of tuner 2 for VCR 4, which is automatically controlled by the "G Codes" ("Plus Codes" in the United States) even though no videotape has been loaded into VCR 4, the present application enables the following:

(i) Monitoring on TV set 5 an output of tuner 2 for VCR 4, which is controlled in accordance with the "G Codes" even though the videotape has been loaded into VCR 4.

(ii) Watching on TV set 5 a program on a channel different from that of VCR 4 by means of tuner 1, by controlling tuner 2 and VCR 4 in accordance with the "G Code," when a videotape is loaded into VCR 4, as in the case of standard recording.

(iii) Carrying out the same operation as that of (i) by means of the aforementioned manual switch (change-over switch 6) even though a videotape is loaded into VCR 4, or more specifically, monitoring on TV set 5 an output of tuner 2 for VCR 4, which is controlled in accordance with the "G Codes," without operating the videotape.

Also, the present application serves to avoid missed TV programs by displaying without fail on TV set 5 the pre-reserved TV programs designated by the "G Codes," and facilitates at this time the decision as to whether or not the programs should be recorded. Therefore, the present application is of great practical value.

What is claimed is:

1. A device for interfacing a video cassette recorder (VCR) with a television set having a video display, said VCR and television set having respective tuners, and the VCR tuner being of a type responsive automatically to program reservation codes of "VCR plus" type via a remote control unit, the device comprising:

means for detecting whether a videotape is loaded in said VCR;

a switch for supplying to said television set signals from the tuner of said VCR or from the tuner of said television set;

means responsive to said detecting means for controlling said switch between a first operating state (1) to supply said video display with signals from the tuner of said VCR in response to activating said VCR by said remote control unit in accordance with a VCR program reservation code, when no tape is loaded in said VCR, so that the output of the VCR tuner can be monitored by a user, and a second operating state (2) to supply said video display with signals from the tuner of said television set to display a first TV program while said VCR tuner is operating to record a second TV program in accordance with a VCR program reservation code, when a videotape is loaded in said VCR, so that the user can watch on the television set a TV program different from that of the VCR; and a manual control element for operating said switch to supply said video display with signals from the tuner of said VCR for monitoring the second TV program, said manual control element simulating that no tape is loaded in the VCR even when a videotape is loaded in the VCR.

2. The device of claim 1, wherein said switch comprises an analog switch.

3. The device of claim 1, wherein said manual control element drives a flip flop for controlling said switch.

4. The device of claim 3, wherein said flip flop further controls a stop function of said VCR.

5. The device of claim 4, wherein said manual control drives said flip flop between first and second logic states, alternately with successive manual operations of said control element.

6. The device of claim 1, including a logic gate having input terminals supplied by signals from said videotape detecting means and said manual control element, and an output terminal supplying a control signal to said switch.

* * * * *